United States Patent

Weekley

Patent Number: 5,704,622
Date of Patent: Jan. 6, 1998

[54] ICE SLIDER

[76] Inventor: Phillip R. Weekley, 605 Lassen La., Costa Mesa, Calif. 92626

[21] Appl. No.: 697,873

[22] Filed: Aug. 30, 1996

[51] Int. Cl.⁶ .................................................. B62B 13/14
[52] U.S. Cl. .................. 280/21.1; 280/28.11; 280/28.16
[58] Field of Search ........................ 280/845, 16, 21.1, 280/28.11, 28.16, 15, 28

[56] References Cited

U.S. PATENT DOCUMENTS

| | | | |
|---|---|---|---|
| 2,570,674 | 10/1951 | Haywood | 280/8 |
| 3,414,284 | 12/1968 | Rosekrans, Jr. et al. | 280/21 |
| 3,542,389 | 11/1970 | Stiller | 280/16 |
| 3,606,366 | 9/1971 | Engelberger | 280/11.1 |
| 3,879,815 | 4/1975 | Dowling et al. | 24/277 |
| 4,017,097 | 4/1977 | Kvam | 280/615 |
| 4,025,082 | 5/1977 | Lummus | 280/12 H |
| 4,106,786 | 8/1978 | Talbott | 280/8 |
| 4,114,912 | 9/1978 | Sweeney | 280/12 KL |
| 4,936,602 | 6/1990 | Adkins | 280/809 |
| 5,039,130 | 8/1991 | Sheiman et al. | 280/845 |
| 5,181,741 | 1/1993 | Sheiman et al. | 280/845 |
| 5,409,339 | 4/1995 | Rosser | 411/400 |

FOREIGN PATENT DOCUMENTS

| | | | |
|---|---|---|---|
| 626271 | 8/1961 | Canada . | |
| 366214 | 1/1923 | Germany | 636/67 |
| 2838-708 | 3/1979 | Germany | 280/28 |

*Primary Examiner*—Brian L. Johnson
*Assistant Examiner*—Bridget Avery
*Attorney, Agent, or Firm*—Dennis W. Beech

[57] ABSTRACT

The ice slider has a platform on which a person may stand, sit or lie. Under the platform are two or more ice piece holders which clamp ice pieces such that the ice slider may slide on the ground as for example on sloping terrain. The ice clamps are design to hold the ice piece as the ice melts during use until such time as the use has reduced the ice piece to be unusable for further sliding. In the case where a user is seated, steering brakes may be incorporated to allow steering or stopping the ice slider by friction with the ground.

2 Claims, 3 Drawing Sheets

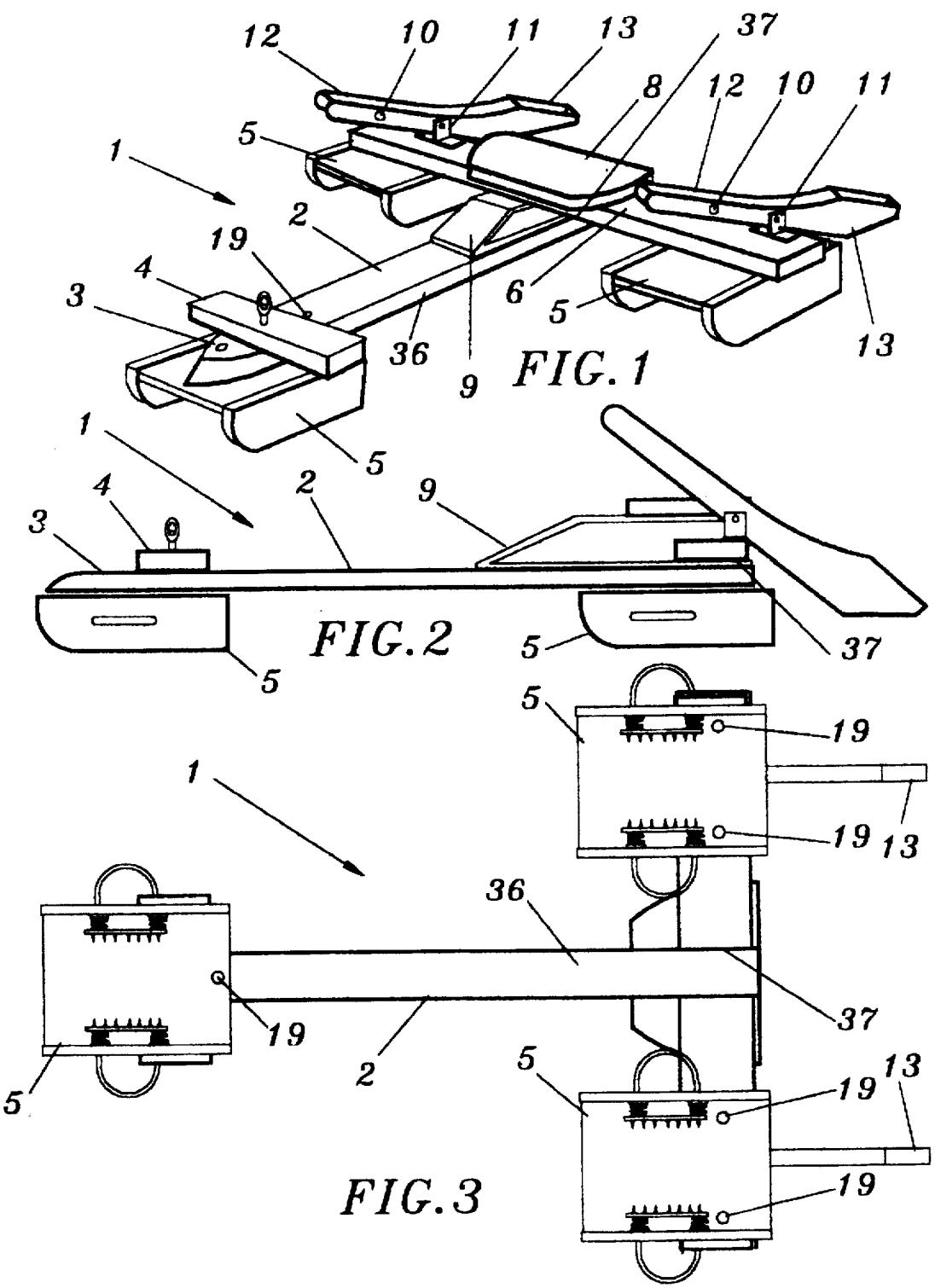

ICE SLIDER

BACKGROUND OF THE INVENTION

1. Field of the Invention

This invention relates to recreational vehicles used for riding down sloping terrains. The new device provides a simple means to attach formed pieces of ice to act as the skids or runners on which the vehicle may slide down a sloped terrain.

2. Description of Related Art

There are currently in use various devices for sliding down sloping terrain. These devices include the well known sled, skis, snowboards, sandboards, etc. These devices use one or more sliding surfaces made of wood, metal, plastic or other composite materials to allow the user to slide on the intended surface. Such known devices may be used on snow, ice, sand, dirt and even grass if the contact surface of the device on the terrain is properly designed. The best known and longest used of these devices are those used for snow and ice as an efficient means for traveling on such surfaces. The use of a wheeled device is more common on dirt or grass surfaces.

The present invention provides a simple method to attach pieces of ice to a sled type device such that the ice serves as the sliding surface contacting grass on sloping terrain. The ice slider user may stand, sit or lie on the slider similar to sleds and other devices used on snow to slide down a slope. In the present invention the use of the low friction of ice for sliding is reversed from the common perception of sliding on snow or ice terrain. With the ice slider the user may slide down a grass slope using ice pieces as skids until they melt. New pieces of ice may be installed for repeated use.

SUMMARY THE INVENTION

A primary objective of the present invention is to provide a means for a person to slide down sloping terrain. A further objective is to allow control of the direction of sliding and braking during sliding.

In accordance with the description presented herein, other objectives of this invention will become apparent when the description and drawings are reviewed.

BRIEF DESCRIPTION OF THE DRAWING

FIG. 1 illustrates a perspective view of the ice slider.

FIG. 2 illustrates a side elevation view of the ice slider.

FIG. 3 illustrates a bottom plan view of the ice slider.

DESCRIPTION OF THE PREFERRED EMBODIMENT

Figure 4:
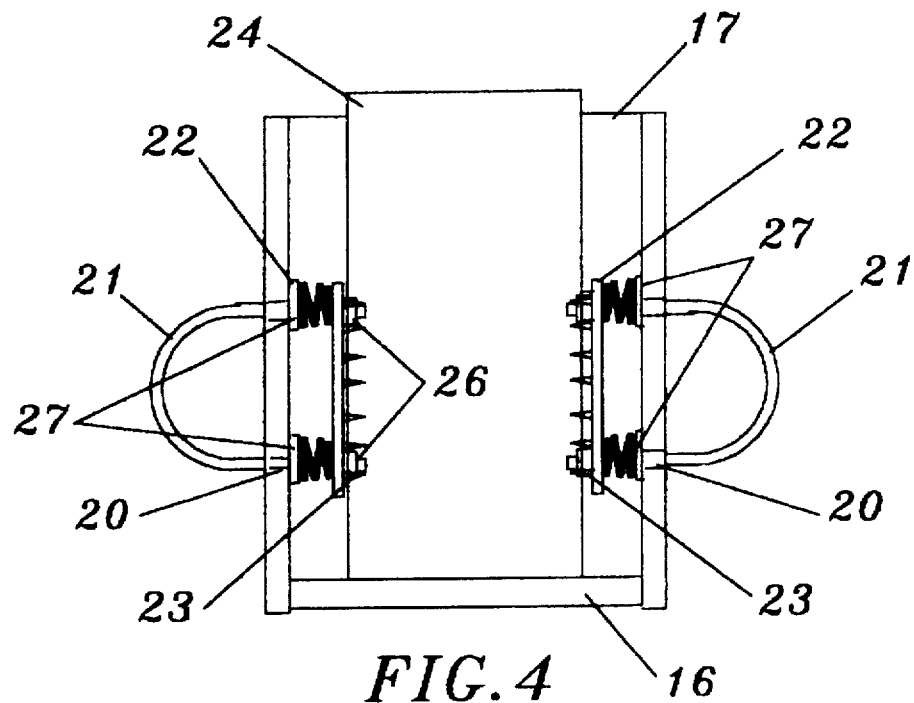
FIG. 4 illustrates a bottom plan view of an ice piece holder.
Figure 5:
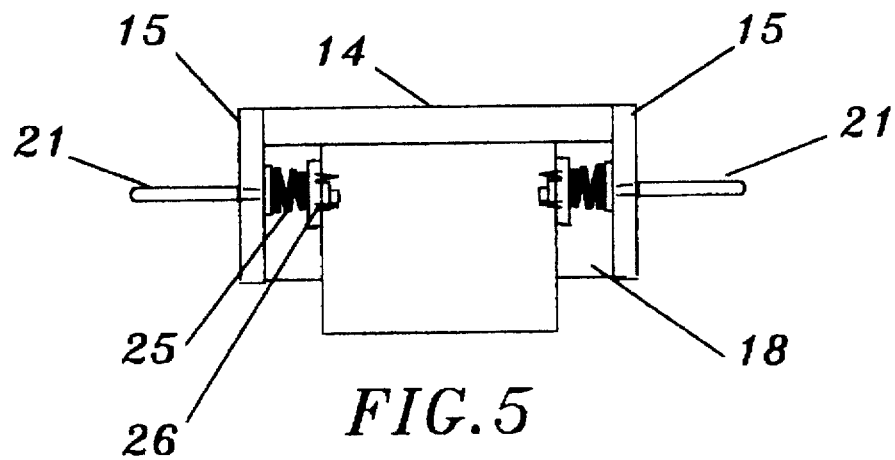
FIG. 5 illustrates a front view of an ice piece holder.

The ice slider consists of platform under which at least two ice piece holders are mounted. The platform has a means for a person to support themselves whether standing, sitting or lying when riding on the device. The ice piece holders have ice clamps to retain pieces of ice such that a portion of the ice piece extends below the ice piece holder for use in movement on the ground.

Referring to FIGS. 1 through 3, the ice slider (1) has a platform (2) formed in the general shape of a "T". The front end (3) of the lateral element (36) of the platform (2) has a foot rest (4) attached on its top and an ice piece holder (5) attached underneath. The transverse element (6) of the platform (2) has an ice piece holder (5) attached under each end (7).

At the platform (2) intersection (37) point where the lateral element (36) and transverse element (6) cross a seat (8) is attached to the top of the platform (2). The seat (8) has riser (9) to provide the user a comfortable elevation above the platform (2) top surface when sitting on the ice slider (1).

The ice slider (1) may also have steering brakes (10) attached on the top of the transverse element (6) intermediate the ends (7) and the seat (8). The steering brakes (10) are attached by means of a pivot bracket (11) such that lifting the hand end (12) causes the brake end (13) to contract the ground. This causes a drag thus slowing the movement of the ice slider (1) on the side which the steering brake (10) is engaged. As can be seen such action may be used to steer the ice slider (1) if only one steering brake (10) is used or if both are used, may be used to slow or stop the ice slider (1).

Figure 7:
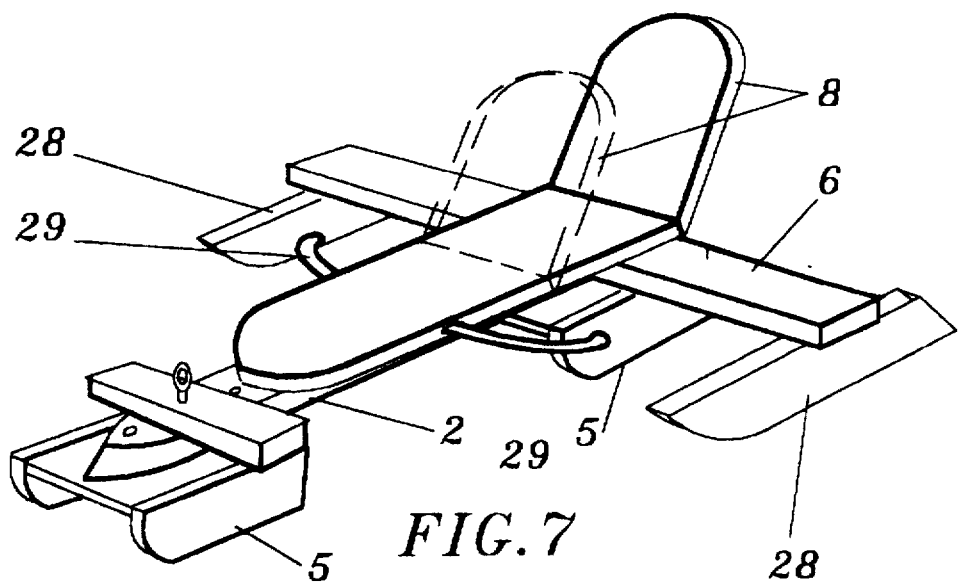
FIG. 7 illustrates a perspective view of the ice slider using two ice piece holders.

An alternate embodiment of the ice slider (1) may be used in which only two ice piece holders (5) are used as illustrated in FIG. 7. In this embodiment the transverse element (6) has runners (28) which may be made of wood. When it is desired to turn or brake the ice slider (1) the user may lean to one side or the other to cause a runner (28) to contact the ground. If the seat (8) is located as illustrated in the dashed line position, a handle bar (29) may be provided for purposes of the user leaning and shifting weight.

Referring to FIGS. 1 through 6, the ice piece holder (5) is generally rectangular shaped open box having a top (14), sides (15) and back (16). The front (17) and bottom (18) are open. The ice piece holder (5) may normally be attached to the platform (2) by means of bolts (19).

In the sides (15) holes (20) are located to receive U-bolts (21). The U-bolts have a spike plate (22) attached by nuts (26) such that the spikes (23) engage an ice piece (24) placed in the ice piece holder (5). To provide pressure to engage the spike plate (22) in the ice piece (24), springs (25) are circumferentially mounted on the U-bolt (21) between the side (18) and the spike plate (22). Washers (27) may be used to provide support for spring (25) if necessary.

Figure 6:
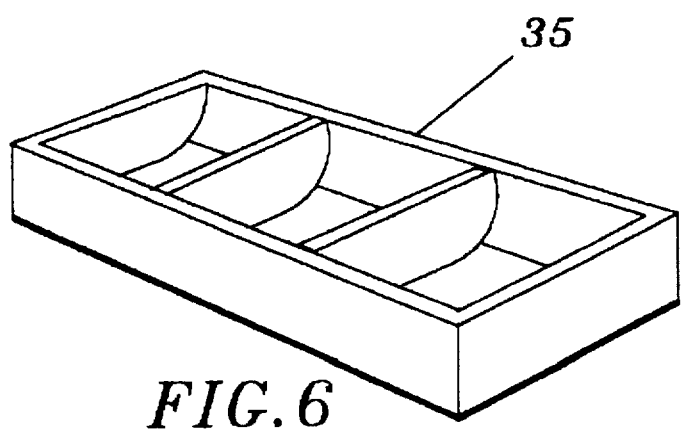
FIG. 6 illustrates an ice tray for three pieces of ice.

Once the ice pieces (24) are mounted in the ice piece holders (5) the ice pieces (24) serve as the friction surface on which the ice slider (1) slides on the ground. It has been found that when the ice slider (1) is used on a grass covered slope many repetitions sliding down the slope are possible depending on conditions. A typical size for the device includes a platform (2) of length 36 inches and width 36 inches made out of 2 inch by 4 inch wood members. The piece holders (5) are 8 inches long by 8¾ inches wide by 3½ inches high. For such dimensions ice pieces (24) of 8 inch length by 4¾ inch width by 4½ inch height were found to give good performance. FIG. 6 illustrates a typical ice piece tray (27) for use in forming ice pieces (24) from water.

Figure 8:
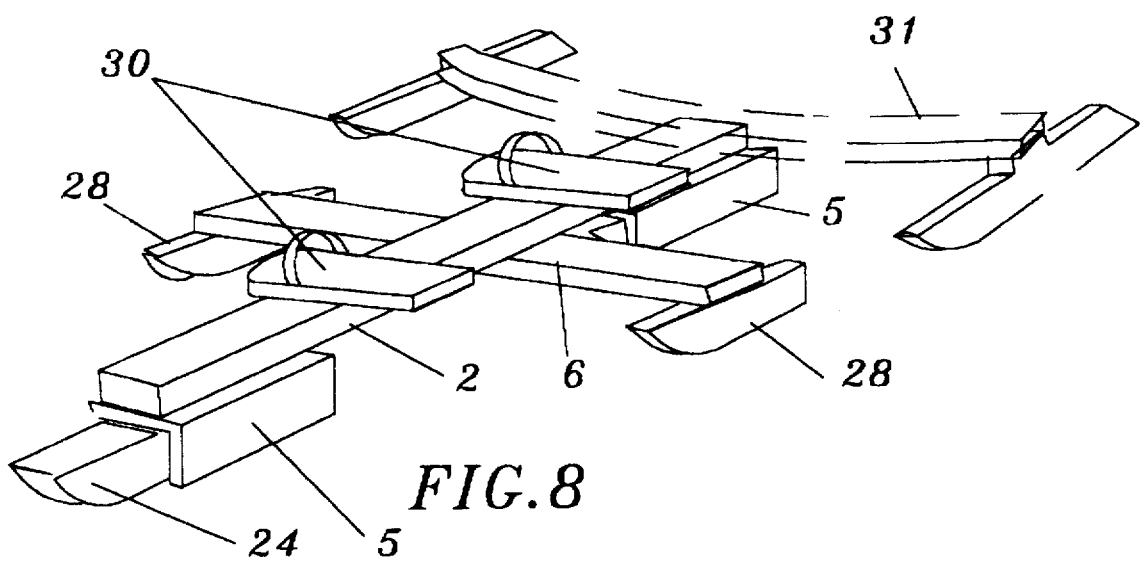
FIG. 8 illustrates a perspective view of the ice slider on which the user may stand.

As can be seen from the disclosure other size and shape ice slider vehicles may be constructed depending on the application. For example a rectangular platform may be used with four ice piece holders (5) located one at each corner. Also a long generally rectangular platform similar to a snowboard may be used with only one ice piece holder (5) mounted on each end as illustrated in FIG. 8. In this embodiment the transverse element (6) may be located between the ice block holders (5) or at the rear as indicated in dashed position (31). Foot mounts (30) are provided for the user to stand on the platform (2).

I claim:

1. A device for carrying a load that slides on the ground comprising:

a plurality of ice piece holders comprising:

a top, two sides and a back are attached in the general shape of a rectangular box wherein a front and a bottom are open;

the sides having two holes defined therein such that a U-bolt extends through the sides and a spike plate is mounted thereon and retained by two nuts; and a spring circumferentially mounted on the U-bolt between the spike plate and the side such that when an ice piece is placed in the ice piece holder to contact the ground the spring applies pressure against the spike plate which in turn presses a plurality of spikes against the ice piece;

a platform having a lateral element and a transverse element attached to form a T;

a front end of the lateral element having a foot rest mounted on top and the ice piece holder mounted underneath;

the transverse element having the ice piece holder mounted underneath at each end; and a seat with a riser attached on top of the platform at an intersection of the lateral element and the transverse element.

2. The device as in claim 1 wherein there is a steering brake attached by a pivot bracket to the transverse element on top intermediate the seat and at each end which steering brake may be rotated to engage the surface on which the device is sliding.

* * * * *